(12) United States Patent
Kuroda et al.

(10) Patent No.: US 11,437,834 B2
(45) Date of Patent: Sep. 6, 2022

(54) STORAGE BATTERY APPARATUS WITH CURRENT CUTOFF CONTROL

(71) Applicant: KABUSHIKI KAISHA TOSHIBA, Minato-ku (JP)

(72) Inventors: Kazuto Kuroda, Tokyo (JP); Jun Takahashi, Kunitachi (JP); Yosuke Saeki, Hino (JP); Ryo Okabe, Hino (JP); Shinya Sato, Kawasaki (JP); Keita Nakata, Kawasaki (JP); Atsushi Inamura, Tokyo (JP); Masahiro Sekino, Tokyo (JP); Minoru Oota, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 97 days.

(21) Appl. No.: 16/812,460

(22) Filed: Mar. 9, 2020

(65) Prior Publication Data

US 2020/0212697 A1 Jul. 2, 2020

Related U.S. Application Data

(63) Continuation of application No. PCT/JP2017/032883, filed on Sep. 12, 2017.

(51) Int. Cl.
*H02J 7/04* (2006.01)
*H02J 7/16* (2006.01)
(Continued)

(52) U.S. Cl.
CPC ....... *H02J 7/0048* (2020.01); *H01M 10/0525* (2013.01); *H01M 10/425* (2013.01);
(Continued)

(58) Field of Classification Search
CPC ..................................................... H02J 7/0048
(Continued)

(56) References Cited

U.S. PATENT DOCUMENTS 6,331,763 B1 * 12/2001 Thomas ................ H02J 7/0029
320/136
9,000,935 B2 * 4/2015 Dao ........................ H04Q 9/00
340/636.1

(Continued)

FOREIGN PATENT DOCUMENTS

JP 2013-070441 A 4/2013
JP 2013-078241 A 4/2013
(Continued)

OTHER PUBLICATIONS

International Search Report dated Oct. 17, 2017 in PCT/JP2017/032883 filed on Sep. 12, 2017, 1 page.

*Primary Examiner* — Yalkew Fantu
(74) *Attorney, Agent, or Firm* — Maier & Maier, PLLC

(57) ABSTRACT

An apparatus according to one embodiment includes a positive and a negative electrode terminals; modules each including an assembled battery and a CMU, the assembled battery including cells, the CMU to detect a voltage and a temperature of the assembled battery; a main circuit for electrical connection between terminals of the modules and the positive and negative electrode terminals; a BMU to receive information about the voltage and the temperature from the respective CMU; a supply circuit to convert DC power from the main circuit and supply the converted power to the BMU; a breaker for interrupting the main circuit; and a circuit to block a current flowing through the main circuit in a direction of charging the modules, in response to a stop of a control signal from the BMU.

4 Claims, 1 Drawing Sheet

(51) Int. Cl.
*H02J 7/00* (2006.01)
*H01M 10/0525* (2010.01)
*H01M 10/42* (2006.01)
*H01M 10/48* (2006.01)
*H01M 50/572* (2021.01)

(52) U.S. Cl.
CPC ..... *H01M 10/4207* (2013.01); *H01M 10/482* (2013.01); *H01M 10/486* (2013.01); *H01M 50/572* (2021.01); *H02J 7/0013* (2013.01); *H02J 7/00304* (2020.01); *H01M 2010/4271* (2013.01)

(58) Field of Classification Search
USPC .......................................................... 320/152
See application file for complete search history.

(56) References Cited

U.S. PATENT DOCUMENTS

| | | | |
|---|---|---|---|
| 2010/0119881 A1* | 5/2010 | Patel | H01M 10/0525 429/7 |
| 2012/0175953 A1* | 7/2012 | Ohkawa | B60L 58/14 307/18 |
| 2014/0152261 A1* | 6/2014 | Yamauchi | G01R 31/396 320/118 |
| 2014/0203765 A1 | 7/2014 | Kuroda et al. | |
| 2015/0037656 A1 | 2/2015 | Noda et al. | |
| 2016/0172896 A1* | 6/2016 | Hidaka | H04B 5/0093 320/108 |

FOREIGN PATENT DOCUMENTS

| | | |
|---|---|---|
| JP | 2014-143795 A | 8/2014 |
| WO | WO 2013/140605 A1 | 9/2013 |

* cited by examiner

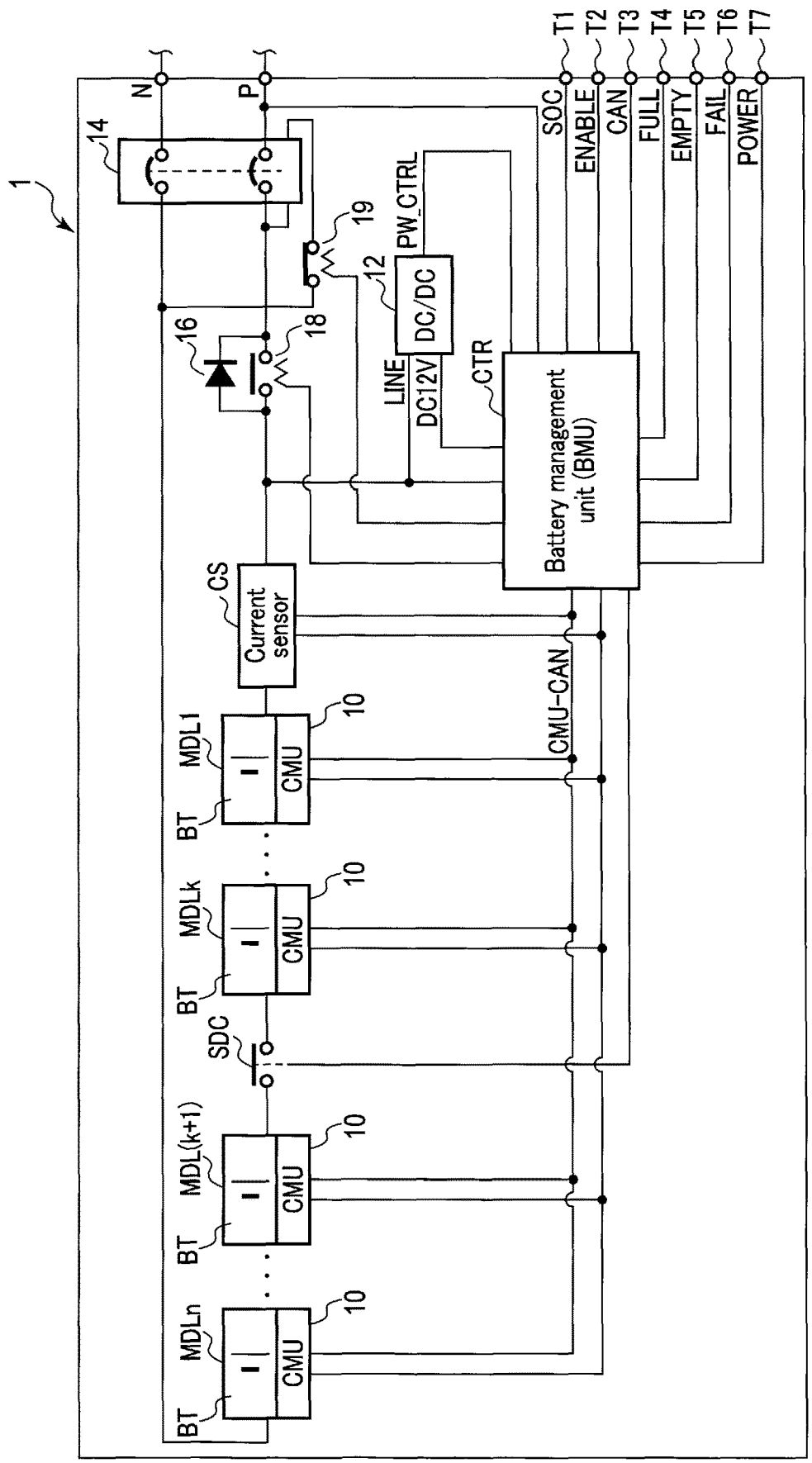

STORAGE BATTERY APPARATUS WITH CURRENT CUTOFF CONTROL

CROSS REFERENCE TO RELATED APPLICATIONS

This application is a Continuation Application of PCT Application No. PCT/JP2017/032883, filed Sep. 12, 2017, the entire contents of which are incorporated herein by reference.

FIELD

Embodiments described herein relate generally to a storage battery apparatus.

BACKGROUND

Realizing a storage battery apparatus with battery cells of higher energy density has been a desire in recent years, expecting a demand for power energy for use in various situations.

A storage battery apparatus, for example, with an assembled battery formed of multiple lithium ion battery cells generally includes a cell monitoring unit (CMU) for monitoring the voltages of the battery cells and the temperature of the assembled battery, and a battery management unit (BMU) as a control circuit for controlling the operation of the storage battery apparatus. The battery management unit may adopt a configuration which, for example, enables its activation using power from the assembled battery via a DC/DC converter. The cell monitoring unit operates with a supply of power from the battery management unit.

In the event that an assembled battery turns an abnormal state, such as a state of overcharge or overheat, the assembled battery should cease from charge and discharge in order to secure safety.

However, with the configuration for activation using power from the assembled battery via a DC/DC converter, the battery management unit at the occurrence of overdischarge of the assembled battery or failure in the DC/DC converter could be halted while the main circuit is left uninterrupted. When this is the case, charge and discharge of the storage battery apparatus are permitted without the battery cells being monitored for their voltages, temperature, etc. As such, an assembled battery turning an abnormal state in this case cannot trigger the cease of charge and discharge of the storage battery apparatus, and the assembled battery could consequently fall into unsafe conditions.

BRIEF DESCRIPTION OF THE DRAWING

FIG. 1 is a block diagram schematically showing an exemplary configuration of a storage battery apparatus according to a certain embodiment.

DETAILED DESCRIPTION

In general, according to one embodiment, a storage battery apparatus includes a positive electrode terminal and a negative electrode terminal adapted for external connection; a plurality of battery modules each comprising an assembled battery and a cell monitoring unit, the assembled battery comprising a plurality of battery cells, the cell monitoring unit configured to detect a voltage of the battery cells and a temperature of the assembled battery; a main circuit for electrical connection between a high potential side terminal of the battery modules and the positive electrode terminal, and between a low potential side terminal of the battery modules and the negative electrode terminal; a battery management unit configured to receive information about the voltage of the battery cells and the temperature of the assembled battery from the respective cell monitoring unit; a supply circuit configured to convert DC power from the main circuit into a predetermined DC power and supply the converted power to the battery management unit; a circuit breaker for interrupting the main circuit in response to an overcurrent flowing in the main circuit; and a charge current cutoff circuit configured to block a current flowing through the main circuit in a direction of charging the battery modules, in response to a stop of a control signal from the battery management unit.

Now, the storage battery apparatus according to one embodiment will be described in detail with reference to the drawing.

FIG. 1 is a block diagram schematically showing an exemplary configuration of the storage battery apparatus according to one embodiment.

The storage battery apparatus 1 according to this embodiment includes a positive electrode terminal P and a negative electrode terminal N adapted for external connection with a load system (not illustrated), etc. The storage battery apparatus 1 can supply power to the load system, and can be charged with power supplied from the load system. The storage battery apparatus 1 may be embraced by the load system.

The storage battery apparatus 1 includes multiple terminals adapted for external, electrical connections. In the context of this embodiment, the storage battery apparatus 1 is provided with an SOC terminal T1, an ENABLE terminal T2, a CAN communication terminal T3, a FULL terminal T4, an EMPTY terminal T5, a FAIL terminal T6, and a power input terminal (POWER terminal) T7.

The SOC terminal T1 is a terminal for outputting a state-of-charge (SOC) value from the storage battery apparatus 1 to an external entity.

The ENABLE terminal T2 is a terminal to which a signal for switchover between the start and stop of the storage battery apparatus 1 is supplied.

The CAN communication terminal T3 is a terminal for the storage battery apparatus 1 to perform signal transmissions with an external entity according to a control area network (CAN) protocol. For example, the storage battery apparatus 1 can communicate with various devices embraced by the load system via CAN bus lines (not illustrated).

The FULL terminal T4 is a terminal for informing an external entity of the storage battery apparatus 1 being in a fully-charged state.

The EMPTY terminal T5 is a terminal for informing an external entity of the storage battery apparatus 1 being in a completely-discharged state.

The FAIL terminal T6 is a terminal for informing an external entity of a failure in the storage battery apparatus 1.

The power input terminal T7 is a terminal for supplying power from an external entity at the time of staring the storage battery apparatus 1 in, for example, a maintenance mode. The power input terminal T7 may be limited to use by maintenance workers. Thus, for example, the power input terminal T7 is not required to be at a portion of the storage battery apparatus 1 that is exposed to the outside, and may be sealed with a cover which is detachable for maintenance work.

The storage battery apparatus 1 includes multiple battery modules MDL1 to MDLn, a battery management unit (BMU) CTR, a DC/DC converter (supply circuit) 12, a circuit breaker 14, a charge current cutoff circuit, a tripping circuit for the circuit breaker 14, a current sensor CS, and a service disconnector SDC. The tripping circuit for the circuit breaker 14 includes a path for supplying a current (tripping current) from a main circuit to the circuit breaker 14, and an electromagnetic contactor (first electromagnetic contactor) 19 for this path to switch its electrical connection. The charge current cutoff circuit includes a diode 16 and an electromagnetic contactor (second electromagnetic contactor) 18. The main circuit may include a high potential side main circuit and a low potential side main circuit.

The multiple battery modules MDL1 to MDLn each include an assembled battery BT and a cell monitoring unit (CMU) 10. The assembled batteries BT's of the battery modules MDL1 to MDLn are connected in series via the service disconnector SDC. Among the terminals of the battery modules MDL1 to MDLn, the terminal on the highest potential side (the high potential side terminal of the battery module MDL1) and the positive electrode terminal P are electrically connected by a high potential side main circuit. Also, among the terminals of the battery modules MDL1 to MDLn, the terminal on the lowest potential side (the low potential side terminal of the battery module MDLn) and the negative electrode terminal P are electrically connected by a low potential side main circuit.

The assembled batteries BT's are each constituted by, for example, a combination of multiple secondary lithium ion battery cells (not shown), and adapted to provide a predetermined capacity and output. The battery module MDL on the highest potential side has its positive electrode terminal electrically connectable with the positive electrode terminal P of the storage battery apparatus 1 via the charge current cutoff circuit and the circuit breaker 14. The battery module MDL on the lowest potential side has its negative electrode terminal electrically connectable with the negative electrode terminal N of the storage battery apparatus 1 via the circuit breaker 14. Note that the assembled batteries BT's may include secondary battery cells other than lithium ion batteries. For example, the assembled batteries BT's may employ, for example, nickel hydride batteries, lead batteries, and so on.

In each of the battery modules MDL1 to MDLn, the cell monitoring unit 10 detects the voltage between the positive electrode terminal and the negative electrode terminal of each of the multiple secondary battery cells of the respective assembled battery BT. The cell monitoring unit 10 also detects at least one nearby temperature of the respective assembled battery BT. The cell monitoring unit 10 is adapted for communication according to, for example, a control area network (CAN) protocol via a communication line (CMU-CAN) connected to the later-described battery management unit CTR. The cell monitoring unit 10 periodically transmits the results of detecting the voltages and the temperature to the battery management unit CTR.

In the cell monitoring unit 10, the voltage detection circuit and the temperature detection circuit (on the main circuit side) differ in reference voltage from the communication circuit (on the battery management unit side) As the storage battery apparatus 1 according to this embodiment is a large storage battery apparatus including the multiple battery modules MDL1 to MDLn connected to one another, large currents flow through its main circuit. On the other hand, the communication circuit of the cell monitoring unit 10 operates with a power supply of 12V from the battery management unit CTR. The main circuit side and the communication circuit side in the cell monitoring unit 10 are therefore insulated from each other, and operate based on different voltages.

For example, the cell monitoring unit 10 may include at least one processor and one memory so that it is adapted to implement the above operations according to software, or may be configured with hardware-constituted circuitry to implement the above operations, or may be configured with a combination of software and hardware to implement the above operations.

The service disconnector SDC is a breaker for maintenance. The service disconnector SDC is arranged at a location which is, for example, substantially the midpoint along the serially- and electrically-connected multiple battery modules MDL1 to MDLn (between the battery module MDLk and the battery module MDL (k+1)) so that the service disconnector SDC can cut the electrical connection of the battery modules MDL1 to MDLn. By opening the service disconnector SDC at the time of maintenance of the battery modules MDL1 to MDLn, the safety of maintenance workers can be secured. The service disconnector SDC is, for example, an electromagnetic contactor, and its operation can be controlled by control signals from the battery management unit CTR.

Note that the service disconnector SDC may be omitted in the instances where, for example, the disclosure is applied to a storage battery apparatus having a small number of battery modules MDL1 to MDLn, and the safety of workers can be secured at the time of maintenance even with the battery modules MDL1 to MDLn kept connected.

The current sensor CS includes a current detection circuit (not illustrated) for detecting a current in the high potential side main circuit line connected between the high potential side terminal of the highest potential side assembled battery BT and the charge current cutoff circuit, and a communication circuit (not illustrated) for transmitting detection values to the outside. The current sensor CS operates with a supply of power from, for example, the battery management unit CTR. Also, the current sensor CS is adapted to communicate with the battery management unit CTR, periodically detect the current flowing into the multiple assembled batteries BT's, and transmit the detection result to the battery management unit CTR according to, for example, the CAN protocol.

The current detection circuit (on the main circuit side) and the communication circuit (on the battery management unit side) in the current sensor CS differ in reference voltage. As the storage battery apparatus 1 according to the embodiment is a large storage battery apparatus including the multiple battery modules MDL1 to MDLn connected to one another, large currents flow through the main circuit. On the other hand, the current sensor CS has its communication terminal electrically connected to the battery management unit CTR. Thus, the main circuit side and the communication circuit side in the cell monitoring unit 10 are insulated from each other, and operate based on different voltages.

Note that, while it is preferred for the storage battery apparatus 1 according to the embodiment to include the current sensor CS, the current sensor CS is not a requisite and may be omitted. With the current sensor CS, the battery management unit CTR can calculate the state of charge (SOC) more accurately by combining the current detection result from the current sensor CS and the voltage detection result from each cell monitoring unit 10. Also, the battery management unit CTR can determine whether or not to subject the assembled detection result from the current sensor CS.

The forcible charge in the context of this disclosure is a charge operation to perform when, for example, the assembled batteries BT's have been overdischarged, and the circuit breaker 14 and a contact point in the electromagnetic contactor 18 of the charge current cutoff circuit have been opened for protection of the battery cells. In the forcible charge, in order to restore the storage battery apparatus 1 to a usable condition, a charger is coupled to the positive electrode terminal and the negative electrode terminal by a maintenance worker, then the battery management unit CTR is placed in a special setting using a terminal device through the CAN communication terminal T3, and charge is conducted with the circuit breaker 14 and the contact point in the electromagnetic contactor 18 of the charge current cutoff circuit closed. This forcible charge allows the battery cells in the assembled batteries BT's to regain their voltage, and can accordingly bring the storage battery apparatus 1 into the usable condition.

The circuit breaker 14, which may be a molded case circuit breaker (MCCB), is provided so that it can switch the state of electrical connection between the highest potential side terminal among the multiple battery modules MDL1 to MDLn (the positive electrode terminal of the battery module MDL1) and the positive electrode terminal P, and the state of electrical connection between the lowest potential side terminal among the battery modules MDL1 to MDLn (the negative electrode terminal of the battery module MDLn) and the negative electrode terminal N. The circuit breaker 14 cuts the electrical connection between the high potential side main circuit and the positive electrode terminal P and also the electrical connection between the low potential side main circuit and the negative electrode terminal N, upon occurrence of an overcurrent flow in the main circuit.

The electromagnetic contactor 19 has its one end electrically connected with the high potential side main circuit via the circuit breaker 14, and the other end electrically connected with the low potential side main circuit. The circuit breaker 14 is furnished with, for example, a thermal-type tripping mechanism. In an exemplary operation, when a contact point in the electromagnetic contactor 19 is closed, a current (tripping current) is supplied from the main circuit to the circuit breaker 14 to heat the circuit breaker 14, so that interruption of the main circuit is enabled. The electromagnetic contactor 19 is controlled by the battery management unit CTR for operation. The electromagnetic contactor 19 is adapted as a normally-close contact (B-contact) circuit, and it opens the contact point when the control signal is on and closes the contact point when the control signal is off (or stopped). Note that the circuit breaker 14 may be furnished with an electromagnetic-type tripping mechanism.

The diode 16 is arranged on the route of the high potential side main circuit and connected in such a manner that its forward direction conforms to the direction from the positive electrode of the highest potential side battery module MDL1 toward the positive electrode terminal P of the storage battery apparatus 1. That is, the diode 16 is connected so that it has a directivity of permitting a discharge current to flow from the multiple battery modules MDL1 to MDLn, while not permitting a charge current to flow.

The electromagnetic contactor 18 is connected in parallel with the diode 16 on the high potential side main circuit. The electromagnetic contactor 18 is controlled by the battery management unit CTR for operation. The electromagnetic contactor 18 is adapted as a normally-open contact (A-contact) circuit, and it closes the contact point when the battery management unit CTR is active (when the control signal is on) and opens the contact point when the battery management unit CTR is in a halt (when the control signal is off (or stopped)).

With the electromagnetic contactor 18 having closed the contact point, the multiple battery modules MDL1 to MDLn can be charged and discharged via the circuit breaker 14. With the electromagnetic contactor 18 having opened the contact point, the diode 16 blocks the charge current from flowing toward the battery modules MDL1 to MDLn so that the battery modules MDL1 to MDLn are only permitted for discharge via the circuit breaker 14.

The DC/DC converter 12 is activated by a power supply from the main circuit line, and converts DC power from the main circuit line into DC power of 12V to be supplied to the battery management unit CTR. The DC/DC converter 12 is controlled by a power control signal PW_CTRL from the battery management unit CTR for operation. For example, if the multiple assembled batteries BT's fall into an overdischarged state, the DC/DC converter 12 stops its operation in response to the power control signal from the battery management unit CTR. Note that the DC/DC converter 12 may be adapted to continue its operation without stopping (e.g., may become a standby state) when the storage battery apparatus 1 has stopped in a normal way.

The battery management unit CTR, for example, may include at least one processor and one memory (not illustrated) so that it is adapted to implement the below-described operations according to software, or may be configured with hardware-constituted circuitry to implement the below operations, or may be configured with a combination of software and hardware to implement the below operations.

The battery management unit CTR acquires the results of voltage and temperature detections from the cell monitoring units 10's of the multiple battery modules MDL's. The battery management unit CTR also acquires, from the current sensor CS, the result of detecting the current flowing into the multiple assembled batteries BT's. The battery management unit CTR is capable of calculating the SOC (state of charge) of the multiple assembled batteries BT's (or the multiple secondary battery cells) using, for example, the voltage, temperature, and current detection results.

The battery management unit CTR may acquire the voltage of the main circuit line. By referring to the voltage of the main circuit line, the battery management unit CTR may determine whether or not the multiple assembled batteries BT's are in an overdischarged state, and whether or not they are in an overcharged state.

As another implementation, the battery management unit CTR integrates the voltages of the multiple assembled batteries BT's for the serially-connected portions based on the voltage detection results for the secondary battery cells from the multiple cell monitoring units 10's. The battery management unit CTR may in this manner determine whether or not the multiple assembled batteries BT's are in an overdischarged state, and whether or not they are in an overcharged state, with reference to the obtained integrated voltage corresponding to the voltage of the main circuit line.

The battery management unit CTR could be easily influenced by voltage divisions, etc., when acquiring the voltage of the main circuit line. Obtaining the voltage corresponding to the voltage of the main circuit line through the integrating calculation for the serially-connected portions of the multiple assembled batteries BT's is rather preferable, as it is less susceptible to voltage divisions and allows for more accurate detection of the voltage of the main circuit line. Accurately determining whether or not the multiple assembled batteries BT's are in an overdischarged state, and whether or not they are in an overcharged state, is therefore possible.

Additionally, the storage battery apparatus 1 or the battery management unit CTR may include a battery deterioration estimating unit (not illustrated) so that the battery management unit CTR can refer to the result of estimating the deterioration of the multiple assembled batteries BT's to determine whether or not to enter a forcible charge mode, or select an appropriate mode from multiple forcible charge modes, with accuracy. For example, the battery deterioration estimating unit can estimate the deterioration of the assembled batteries BT's based on information such as the state of health (SOH) of the battery cells, use history, and so on.

The battery management unit CTR operates with power (DC 12V) supplied from the multiple assembled batteries BT's via the DC/DC converter 12, and supplies power to the multiple cell monitoring units 10's and the current sensor CS. Also, the battery management unit CTR can control the operations of the service disconnector SDC, the circuit breaker 14 and the electromagnetic contactors 18 and 19.

The battery management unit CTR is electrically connected to the multiple terminals of the storage battery apparatus 1, that is, the SOC terminal T1, the ENABLE terminal T2, the CAN communication terminal T3, the FULL terminal T4, the EMPTY terminal T5, the FAIL terminal T6, and the power input terminal T7.

The battery management unit CTR can output the SOC of the multiple assembled batteries BT's (or the multiple secondary battery cells) to the SOC terminal T1.

The battery management unit CTR is activated according to a voltage applied to the ENABLE terminal T2. For example, the battery management unit CTR is adapted for activation in response to a signal supplied from the ENABLE terminal T2 having turned a high (H) level.

The battery management unit CTR can communicate with an externally connected device via the CAN communication terminal T3 using signals according to the CAN protocol. The battery management unit CTR may be adapted to store a set of information for a predetermined period that contains, for example, the results of voltage, current, temperature, and SOC detections for the multiple assembled batteries ET's, control information for each component of the storage battery apparatus 1, and so on in an internal memory, and upon receipt of a request from an external entity, read the information from the memory and output it to the external entity as past log information.

The battery management unit CTR may determine that the multiple assembled batteries BT's are fully charged in response to their SOC becoming equal to or greater than a predetermined threshold, and output a signal indicative of the fully-charged state to the FULL terminal T4.

The battery management unit CTR may determine that the multiple assembled batteries BT's are completely discharged in response to their SOC falling below a predetermined threshold, and output a signal indicative of the completely-discharged state to the EMPTY terminal T5.

The battery management unit CTR, upon determining a failure in the storage battery apparatus 1, may output a signal indicative of the failure to the FAIL terminal T6. For example, the battery management unit CTR may determine a failure in the storage battery apparatus 1 in response to the multiple assembled batteries BT's turning an overcharged state or an overdischarged state, and notify an external entity of the failure via the FAIL terminal T6.

The battery management unit CTR may be adapted so that it is activated by power (12V) supplied from the outside via the power input terminal T7. Note that the power input terminal T7 may have an electrical connection to the power supply line between the DC/DC converter 12 and the battery management unit CTR. The battery management unit CTR may include a common terminal for the power input from the power input terminal T7 and the power input from the DC/DC converter 12, or separate, independent terminals for the respective power inputs.

Next, an exemplary operation of the storage battery apparatus 1 at the detection of an abnormality will be described. The storage battery apparatus 1 assumes the detection of an abnormality and ceases from charge and discharge when, for example, the assembled batteries BT's fall into an overcharged state, the assembled batteries BT's fall into an overdischarged state, the assembled batteries BT's fall into an overheat state, or a failure in the component within the storage battery apparatus 1 is detected.

The battery management unit CTR receives information about the voltages of the battery cells and the temperatures of the assembled batteries BT's from the multiple battery modules MDL1 to MDLn, and information about the current in the main circuit from the current sensor CS. When, for example, it is determined that the assembled batteries BT's are fully charged, the battery management unit CTR outputs a signal indicative of the fully-charged state to the FULL terminal T4.

If charging the multiple assembled batteries BT's further continues in this state, the battery management unit CTR keeps monitoring the voltages of the battery cells, the temperatures of the assembled batteries BT's, and the current flowing in the main circuit, and upon determining that the assembled batteries BT's fall into an overcharged state, assumes a failure in the storage battery apparatus 1 and notifies an external entity of the failure via the FAIL terminal T6. The battery management unit CTR at this time turns off the control signal to cause the electromagnetic contactor 19 to close the contact point and permit a current to be supplied to the circuit breaker 14, so that the circuit breaker 14 is opened and the main circuit can be interrupted. Accordingly, the multiple assembled batteries BT's are evacuated from further charge, and the storage battery apparatus 1 can avoid falling into unsafe conditions.

Next, description will also be given of an exemplary operation performed by the storage battery apparatus 1 when the battery management unit CTR is halted upon termination of a power supply to it.

For example, when the supply of power (DC 12V) to the battery management unit CTR is terminated due to a failure in the DC/DC converter 12, etc., the battery management unit CTR is halted, and the voltages of the battery cells, the temperatures of the assembled batteries, and the current flowing in the main circuit are then no longer monitored.

The halt of the battery management unit CTR at this time turns off the control signal from the battery management unit CTR to the electromagnetic contactor 19 so that the contact point in the electromagnetic contactor 19 is closed and the current path is connected to the circuit breaker 14. Accordingly, a current is supplied to the circuit breaker 14 to heat the circuit breaker 14, and the main circuit is interrupted by the circuit breaker 14. Also, when the control signal from the battery management unit CTR is stopped, the contact point in the electromagnetic contactor 18 is opened as the control signal to the electromagnetic contactor 18 is off, and the electrical connection of the main circuit is cut.

As such, the high potential side terminal of the battery module MDL1 is electrically connected to the positive electrode terminal P of the storage battery apparatus 1 via the diode 16 and the circuit breaker 14 for the period from the halt of the battery management unit CTR to the interruption of the main circuit by the circuit breaker 14. The charge current to the multiple battery modules MDL1 to MDLn is thus blocked, and the battery modules MDL1 to MDLn are only permitted for discharge.

In the instances where lithium ion battery cells are charged without their voltages and temperatures being monitored, the battery cells may fall into an overvoltage state, which could result in explosion, combustion, or the like to hurt a user.

With the storage battery apparatus 1 according to the embodiment, in the event that a power supply to the battery management unit CTR is terminated and it makes monitoring the voltages, etc. of the multiple battery cells impossible, the charge current to the multiple battery modules MDL1 to MDLn is blocked so that the multiple assembled batteries BT's are prevented from becoming an overcharged state and consequently the storage battery apparatus 1 can avoid falling into unsafe conditions. Moreover, even if the operation of the battery management unit CTR experiences a sudden halt, the storage battery apparatus 1 does not stop its discharge at once, and therefore, the sudden stop of the power supply to the load system can be avoided.

That is, the storage battery apparatus 1 according to the embodiment can secure its safety.

While certain embodiments have been described, they have been presented by way of example only, and are not intended to limit the scope of the inventions. Indeed, the novel embodiments described herein may be embodied in a variety of other forms. Furthermore, various omissions, substitutions, and changes in the form of the embodiments may be made without departing from the spirit of the inventions. The accompanying claims and their equivalents are intended to cover such forms or modifications as would fall within the scope and spirit of the inventions.

The invention claimed is:

1. A storage battery apparatus, comprising:
a positive electrode terminal and a negative electrode terminal adapted for external connection;
a plurality of battery modules each comprising an assembled battery and a cell monitoring unit, the assembled battery comprising a plurality of battery cells, the cell monitoring unit configured to detect a voltage of the battery cells and a temperature of the assembled battery;
a main circuit for electrical connection between a high potential side terminal of the battery modules and the positive electrode terminal, and between a low potential side terminal of the battery modules and the negative electrode terminal;
a battery management unit configured to receive information about the voltage of the battery cells and the temperature of the assembled battery from the respective cell monitoring unit;
a supply circuit configured to convert DC power from the main circuit into predetermined DC power and supply the converted power to the battery management unit;
a circuit breaker for interrupting the main circuit in response to an overcurrent flowing in the main circuit; and
a charge current cutoff circuit configured to block a current flowing through the main circuit in a direction of charging the battery modules, when a control signal from the battery management unit is stopped due to a supply of power to the battery management unit being terminated and the battery management unit being halted.

2. The storage battery apparatus according to claim 1, further comprising a tripping circuit for the circuit breaker, the tripping circuit comprising a path for supplying a tripping current from the main circuit to the circuit breaker, and a first electromagnetic contactor configured to close a contact point on the path in response to the stop of the control signal from the battery management unit.

3. The storage battery apparatus according to claim 2, wherein the charge current cutoff circuit comprises a diode on the main circuit and a second electromagnetic contactor connected in parallel with the diode, the diode having a forward direction conforming to a direction of a current flowing from the high potential side terminal of the battery modules to the positive electrode terminal, the second electromagnetic contactor configured to open a contact point in response to the stop of the control signal from the battery management unit.

4. The storage batter apparatus according to claim 1, wherein the charge current cutoff circuit comprises a diode on the main circuit and a second electromagnetic contactor connected in parallel with the diode, the diode having a forward direction conforming to a direction of a current flowing from the high potential side terminal of the battery modules to the positive electrode terminal, the second electromagnetic contactor configured to open a contact point in response to the stop of the control signal from the battery management unit.

* * * * *